April 5, 1960
J. W. WIESMANN
2,931,213
BUILDING AND COMBINATION AIR AND WIRE DISTRIBUTING STRUCTURE
Filed July 11, 1955
2 Sheets-Sheet 2
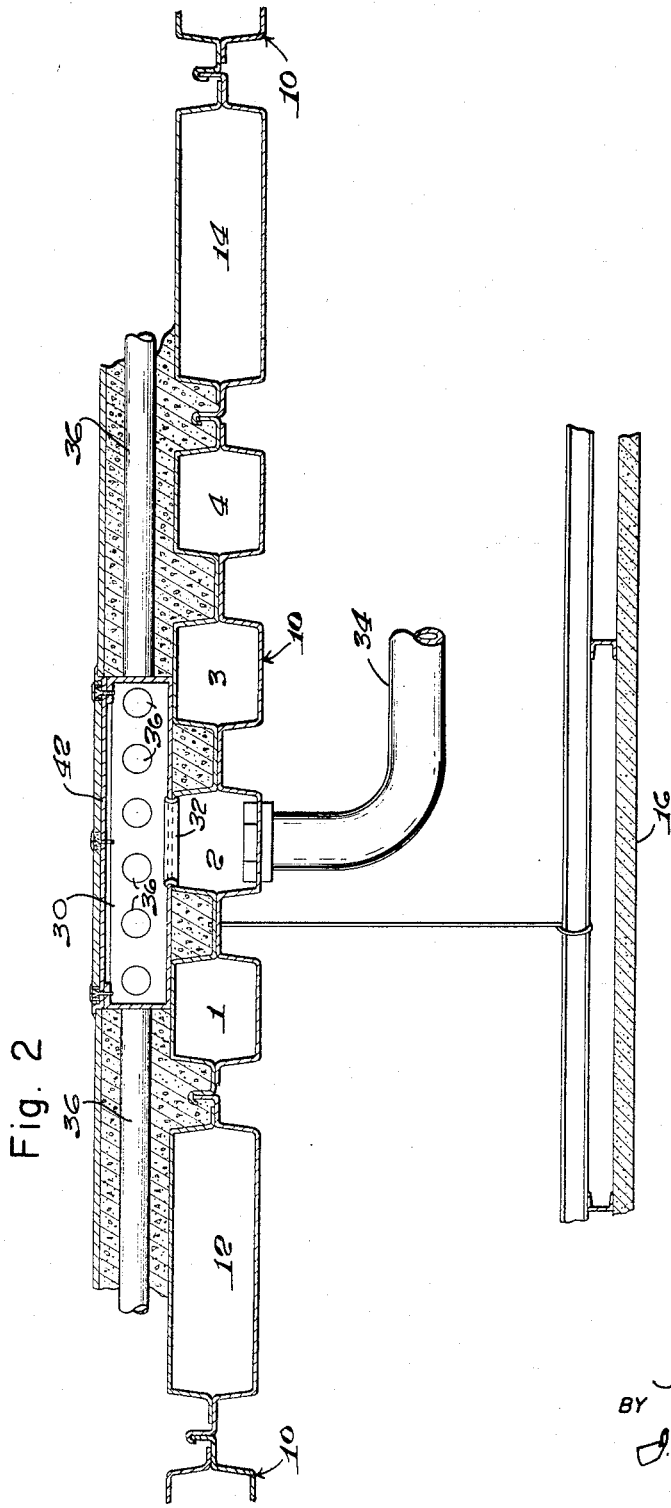
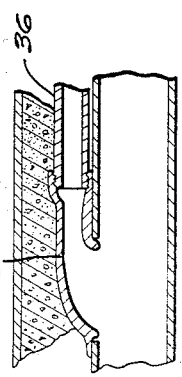
INVENTOR
Joseph W. Wiesmann
BY
J. Stanley Churchill
ATTORNEY

United States Patent Office 2,931,213
Patented Apr. 5, 1960

2,931,213

BUILDING AND COMBINATION AIR AND WIRE DISTRIBUTING STRUCTURE

Joseph W. Wiesmann, Pittsburgh, Pa., assignor to H. H. Robertson Company, Pittsburgh, Pa., a corporation of Pennsylvania Application July 11, 1955, Serial No. 521,086

1 Claim. (Cl. 72—16)

This invention relates to a building and combination air and wire distributing structure.

One object of the invention is to provide a novel building and combination air and wire distributing structure embodying a metallic cellular load supporting floor including a plurality of generally parallel cells forming potential air and wire distributing conduits which enables selected of the cells forming the potential air conduits to be used to distribute heated air and other cells to be used as wire distributing cells with provisions for servicing the wire distributing cells in a manner such as to minimize the excessive heating of the wiring and thereby prevent injury to the insulation thereof.

A further object of the invention is to provide a novel building and combination air and wire distributing structure of the character described embodying cellular metal floors of the type illustrated in the United States patent to Young, No. 1,867,433, and in which provision is made for servicing the various wiring cells from a central junction point in an area to be serviced and from which a plurality of relatively small individual supply conduits may be connected to individual cells, each conduit containing a relatively small number of wires so as to minimize the effect of transmission of heat from the hot air cells to the individual conduits and thus prevent injury to the wiring extended therethrough.

With these general objects in view and such others as may hereinafter appear the invention consists in the building and combination air and wire distributing structure hereinafter described and particularly defined in the claim at the end of this specification.

In the drawings illustrating the preferred embodiment of the invention:

Fig. 2 is a cross sectional view taken on the line 2—2 of Fig. 1; and

Fig. 3 is a cross sectional view taken on the line 3—3 of Fig. 1.

Figure 1:
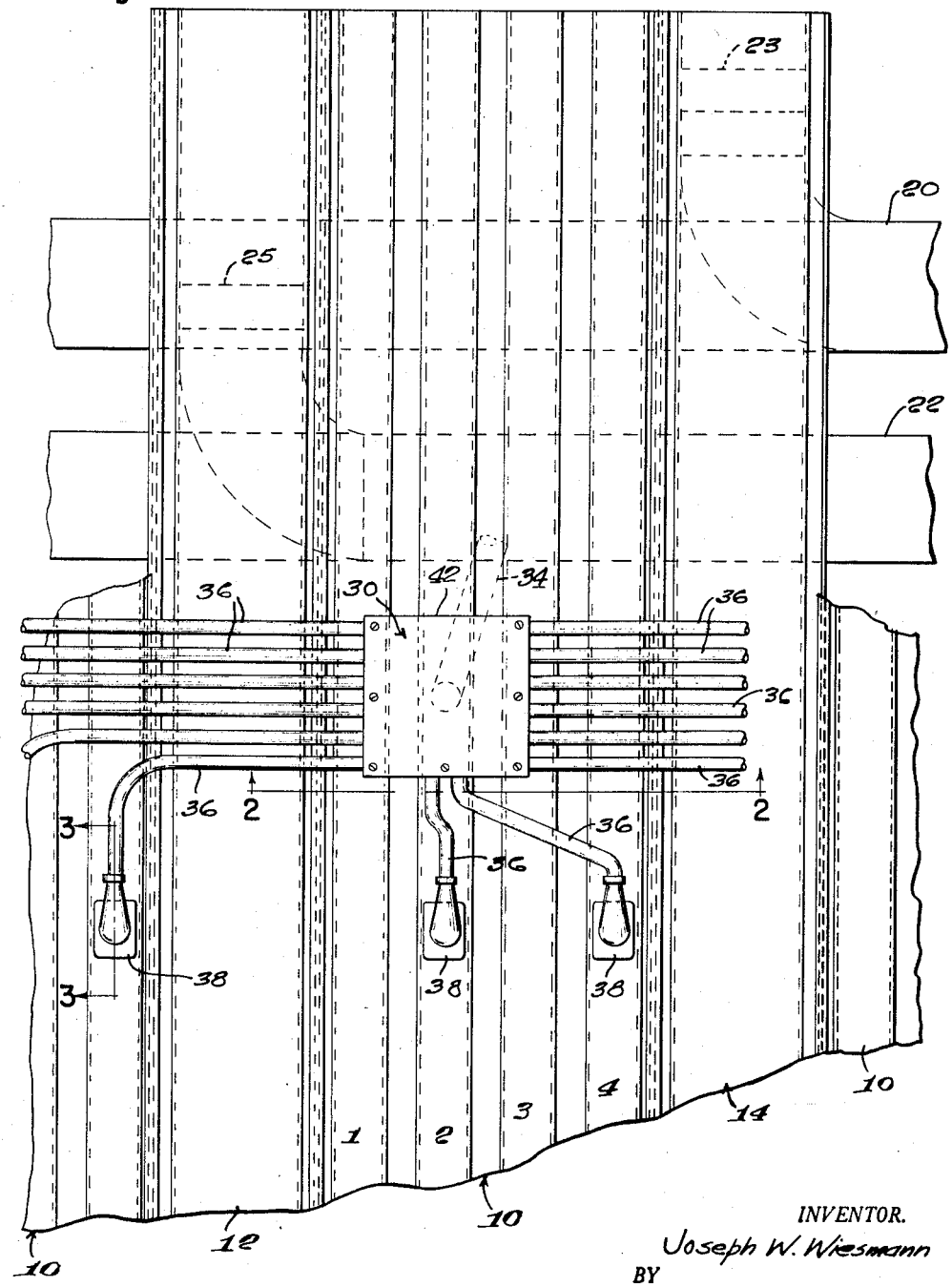
Fig. 1 is a plan view of a portion of the present combination air and wire distributing structure.

In general the present invention pertains to a building and combination air and wire distributing structure which may be used for the various purposes of ventilation, for exhausting air from within the building, for heating and/or for cooling a part or all of the building and also for general air conditioning purposes.

The invention contemplates a structure which finds particular use in a multi-storied building wherein a cellular metal floor, such as is illustrated in the United States patent to Young above referred to, forms the load supporting floor at one or more stories of the building, and is erected upon the usual beams constituting a part of the steel framework of the building. At each story of the building provision is made for forcing air into selected of the floor cells at one portion of the floor whereby the air may flow through the floor cells and be permitted to flow outwardly into selected portions of the building in order to provide the desired ventilation, heating or air conditioning of the building.

Selected cells or groups of cells of cellular metal floors have heretofore been extensively used as wire carrying ducts, and the cellular steel floors manufactured and sold by H. H. Robertson Company, of Pittsburgh, Pennsylvania, assignees of the Young patent above referred to, illustrate the type of floor which may and preferably will form the cellular flooring component of the present building and combination air and wiring distributing structure. In practice in such cellular metal floors selected cells are used for carrying the wiring for one or more types of electrical service, such for example as 110 volt electrical service, low tension electrical service, for telephone service, and for other signal systems. The wiring systems for these various electrical services are usually brought into the building to a panel or other supply point and from such a panel the wiring is run through crossover ducts or headers extending transversely across a large number of the flooring cells either above or below the floor and usually from one side of the building to another. Suitable openings are provided to enable the proper wires of the different services to be fished from the supply headers or crossover ducts through the selected floor cells to be withdrawn at desired points in the building through outlets in the floor cells. In practice the cellular steel floor is manufactured in unit widths and standard lengths, each unit usually embodying a number of cells, usually four, and these floor units are erected in end to end relation and in contiguous side by side relation to form the complete floor. In practice also the crossover ducts or supply headers have comprised metal conduits which have been erected in contact with the upper or lower surfaces of the various cells of the several floor units across which these crossover ducts or headers have been extended.

While the foregoing structure of combination floor and wiring distributing system has proven successful in the large number of buildings in which the same has been employed during the last twenty years, the arrangement of crossover ducts or supply headers is not satisfactory when it is desired to also utilize some of the non-wire-carrying cells for conducting air heated to above room temperature, or systems for heating or air conditioning the building because of the transmission of heat from those cells carrying the heated air into the supply headers and the injury or liability of injury of the insulation of the wiring over a substantial period of time. In such prior crossover ducts or supply conduits a relatively large number of wires are extended therethrough for servicing a relatively large number of cells extending across the floor of the building, and in practice the inherent resistance of the wires causes losses that are dissipated in the form of heat. In accordance with the present invention provision is made for servicing the cells from a junction box disposed substantially centrally of a floor area to be serviced, said junction box having a plurality of relatively small conduits containing a relatively small number of wires so as to avoid concentration of such heat losses, and so that when such conduits pass in proximity to the hot air cells the additional heat transmitted from the hot air cells to the conduits will not increase the temperature to an extent such as to adversely affect the insulation of the wiring in the conduits. In practice the wiring cells are preferably arranged in transversely spaced groups, the wiring for a particular service running through two or more cells of the group, and the air carrying cells may be disposed between adjacent groups of the wiring cells. In the preferred embodiment of the invention the wiring conduits are positioned to cross over both the wire carrying cells and the air carrying ducts and are preferably spaced a short distance above the cellular metal floor and embedded in the concrete floor fill.

Referring now to the drawings, in Figs. 1 and 2 I have illustrated a sufficient portion of the present building and combination wire and air distributing structure to enable the invention to be understood. As therein illustrated, the structure includes a load supporting cellular metal floor, of the type above referred to, produced in accordance with the disclosure of the Young patent above referred to. This cellular metal floor in practice is made in standard units, and in the erection of these units in a building a series of the units are laid end to end over the supporting beams of the framework of the building and form in effect continuous raceways or cells, herein shown as four in number for each unit, which comprise potential conduits for carrying either wire or air from one part of a building to another. Preferably, however, each standard four-cell unit 10 may be used for wiring services and is preferably erected with enlarged cellular units 12, 14 on each side thereof so that, as illustrated in Figs. 1 and 2, four potential wiring ducts are interposed between each pair of air carrying cell units 12, 14. It will be understood that the present load supporting cellular metal floor may embody any form and number of potential wiring or potential air carrying cells provided that a series of groups of wiring cells are interposed laterally between a pair of potential air carrying cells. In practice a furred ceiling may be suspended from the load supporting floor as indicated at 16 in Fig. 2. The ceiling is preferably supported a short distance below the load supporting floor sufficient to permit wiring conduits to be extended through the space between the floor and the ceiling.

As typical of an installation of the present building and combination wire and air distributing structure, I have shown in Fig. 1 a pair of supply air ducts 20, 22. The supply duct 20 transversely extended under the floor may be utilized for the supply of cold air and is connected by a header connection indicated at 23 to the cold air carrying cell 14. The supply duct 22 may be utilized to carry heated air, that is air heated to above room temperature, and this air duct 22 extends transversely under the floor, and both are of a size such as to pass through the space between the suspended ceiling 16 and the floor. The duct 22 is connected by the header connection 25 to the potential air duct 12 which will be hereinafter referred to as the "hot air duct."

For purposes of illustration the several potential wiring cells of the standard unit of the load supporting floor may be designated as cells 1, 2, 3 and 4, and it will be understood that electrical wiring will be run into one end of at least some of the cells of the floor unit at a point adjacent a wall or portion of the building at which the ends are exposed to permit such introduction of wiring into the cells, or in some instances the wiring may be introduced initially into the cells through suitable inlet openings at the top or bottom of the floor cells at a point adjacent the supply point or panel (not shown) to which the particular electrical service is supplied at the particular floor of the building under consideration. As herein shown, cells Nos. 1 and 3 have been designated as cells for carrying the wiring for 110 v. lighting services, and cells Nos. 2 and 4 have been designated as cells for carrying the wiring for telephone services.

In the illustrated embodiment of the invention the individual conduits for supplying wiring service to the cells are preferably spaced a short distance above the cellular metal flooring units and are embedded in the concrete floor fill to provide an entirely concealed wire distribution system. As shown in Fig. 1, a junction box 30 disposed in a substantially central portion of a floor area is placed above a wire distributing unit 10 and is provided in its lower wall with an access opening 32 communicating with one of the cells of the wire distributing unit. The junction box is supplied with the wires from a supply point or service panel (not shown) by a relatively large supply conduit 34 which may and preferably will extend in the space provided between the cellular steel flooring unit and the ceiling 16, such supply conduit 34 being disposed a substantial distance below the flooring.

As illustrated in Fig. 2, a plurality of relatively small supply conduits 36 extending from the central junction point may be provided to supply electrical service to individual cells of each wire distributing unit throughout the floor area. The connections between the individual supply conduits 36 and their individual wire distributing cells may include a fitting 38 as illustrated in Fig. 3. Thus, each individual conduit 36 carries only a relatively small number of wires to service its individual wire distributing cell so as to prevent accumulation of a relatively large mass of wiring in any one conduit, so that the heat generated by the resistance of the wiring in any one conduit added to the heat transmitted to the conduit when passing in proximity to the hot air cells will not reach a temperature such as to adversely affect the insulation of the wiring in the conduits. In practice a junction box disposed substantially centrally of a floor area, as described, is of advantage in that intersplicing of the wires may all be performed at such central junction point. As illustrated in Fig. 2, it will be observed that the junction box is embedded in the concrete floor fill and is provided with a removable cover 42 to permit access for the purpose of fishing and splicing the wiring to the various individual wire distributing cells. It will also be observed that the junction box 30 illustrated is preferably arranged to service cells Nos. 2 and 4 by individual conduits 36 throughout the floor area, and in practice a second junction box similar to the one shown and disposed adjacent the first box may be provided for servicing cells Nos. 1 and 3.

Having thus described the invention, what is claimed is:

A building and combination air and wire distributing structure comprising a cellular metal floor having adjacent metal cellular units erected side by side, one unit having a plurality of cells each of uniform sectional dimension and each constituting a potential wiring duct, and the other adjacent unit having cells of greater sectional dimension than those of the first unit and constituting air carrying ducts, means for conducting hot air from a source of supply to selected of said air carrying cells, a junction box disposed substantially centrally in a floor area of the building and embedded in the floor fill above a cellular wire carrying duct unit of the floor cells and spaced from the air carrying duct units, the junction box having an access opening in the upper wall thereof and an opening in the lower wall communicating with a selected underlying wire carrying cell, a relatively large supply conduit spaced a substantial distance below said cellular metal floor and connecting the underside of said selected cell to an electrical service supply, selected of said wire carrying cells being provided with a conduit fitting communicating with an opening in the top wall of its cell, a plurality of small individual conduits connecting said junction box with said fittings of said wire carrying cells and being spaced a short distance above the cellular metal floor and embedded in said floor fill, said small conduits extending in different angular directions from the junction box to service said selected wire carrying cells throughout the floor area, some of said relatively small conduits extending across said air carrying ducts and each conduit carrying a sufficiently small number of wires so that the combined heat generated within said small conduits and that transmitted therein from the hot air conduits is below that permitted by building codes.

(References on following page)

References Cited in the file of this patent

UNITED STATES PATENTS

| | | |
|---|---|---|
| 2,041,965 | Sargent | May 26, 1936 |
| 2,783,639 | Werner | Mar. 5, 1957 |

OTHER REFERENCES

Sweet's 1952 Catalog, sec. 30b/NA, p. 3.

Sweet's 1954 Catalog, sec. 2a/Ro, p. 2.

National Electrical Code Handbook (eighth edition), 1954, by Abbott and Smith; art. 300, sec. 3012, page 166; art. 354, sec. 3541, page 226; art. 356, sec. 3565, page 232.

District of Columbia Electrical Code (seventh edition), 1933; art. 5, sec. 500, page 56.